United States Patent
Eggleston et al.

(10) Patent No.: US 7,523,381 B2
(45) Date of Patent: Apr. 21, 2009

(54) NON-VOLATILE MEMORY WITH ERROR DETECTION

(75) Inventors: David Eggleston, San Jose, CA (US); Bill Radke, San Francisco, CA (US)

(73) Assignee: Micron Technology, Inc., Boise, ID (US)

( * ) Notice: Subject to any disclaimer, the term of this patent is extended or adjusted under 35 U.S.C. 154(b) by 533 days.

(21) Appl. No.: 11/219,535

(22) Filed: Sep. 1, 2005

(65) Prior Publication Data

US 2007/0061672 A1    Mar. 15, 2007

(51) Int. Cl.
*G06F 11/10* (2006.01)
*G11C 29/00* (2006.01)
(52) U.S. Cl. .................. 714/773; 714/774
(58) Field of Classification Search ........... 714/763, 714/773, 774
See application file for complete search history.

(56) References Cited

U.S. PATENT DOCUMENTS

| | | | |
|---|---|---|---|
| 5,379,262 A * | 1/1995 | Okamoto et al. | 365/230.01 |
| 5,418,752 A * | 5/1995 | Harari et al. | 365/218 |
| 5,603,001 A * | 2/1997 | Sukegawa et al. | 711/103 |
| 5,611,067 A * | 3/1997 | Okamoto et al. | 711/103 |
| 5,715,193 A * | 2/1998 | Norman | 365/185.02 |
| 5,768,560 A | 6/1998 | Lieberman et al. | |
| 5,781,918 A | 7/1998 | Lieberman et al. | |
| 5,920,501 A * | 7/1999 | Norman | 365/185.02 |
| 5,930,815 A * | 7/1999 | Estakhri et al. | 711/103 |
| 5,966,724 A | 10/1999 | Ryan | |
| 5,987,573 A * | 11/1999 | Hiraka | 711/156 |
| 6,000,006 A * | 12/1999 | Bruce et al. | 711/103 |
| 6,130,837 A * | 10/2000 | Yamagami et al. | 365/185.09 |
| 6,426,893 B1 * | 7/2002 | Conley et al. | 365/185.11 |
| 6,651,212 B1 * | 11/2003 | Katayama et al. | 714/763 |
| 6,680,870 B2 * | 1/2004 | Toyama et al. | 365/189.09 |
| 6,754,765 B1 * | 6/2004 | Chang et al. | 711/103 |
| 6,769,087 B2 * | 7/2004 | Moro et al. | 714/763 |
| 6,859,856 B2 * | 2/2005 | Piau et al. | 711/103 |
| 6,868,007 B2 * | 3/2005 | Hasegawa et al. | 365/185.09 |
| 7,012,835 B2 * | 3/2006 | Gonzalez et al. | 365/185.11 |
| 7,350,044 B2 * | 3/2008 | Keays | 711/165 |
| 2001/0023472 A1 * | 9/2001 | Kubushiro et al. | 711/103 |
| 2001/0052102 A1 | 12/2001 | Roohparvar | |
| 2004/0003168 A1 | 1/2004 | Kim et al. | |
| 2005/0080986 A1 | 4/2005 | Park | |
| 2005/0172207 A1 | 8/2005 | Radke et al. | |
| 2006/0018159 A1 | 1/2006 | Picca et al. | |
| 2006/0050576 A1 | 3/2006 | Kim | |
| 2006/0120166 A1 | 6/2006 | Kim et al. | |
| 2006/0227602 A1 | 10/2006 | Houma et al. | |
| 2006/0242485 A1 | 10/2006 | Roohparvar | |

OTHER PUBLICATIONS

"Flash Memory OneNAND Specification", 126 pgs, Jul. 20, 2005.
"Samsung Targets Embedded Space with OneNAND Flash", *Innovation* OneNAND, e-brochure at Samsung.com; http://www.samsung.com/Products/Semiconductor/Support/ebrochure/memory/samsung_innovation_onenand_051102.pdf, (Nov. 2005), 1 pg.

* cited by examiner

*Primary Examiner*—Stephen M Baker
(74) *Attorney, Agent, or Firm*—Schwegman, Lundberg & Woessner, P.A.

(57) ABSTRACT

Data move operations in a memory device are described that enable identification of data errors. Error detection circuitry in the memory device can be operated using parity data or ECC data stored in the memory. Results of the error detection can be accessed by a memory controller for data repair operations by the controller.

25 Claims, 3 Drawing Sheets

NON-VOLATILE MEMORY WITH ERROR DETECTION

FIELD OF THE INVENTION

The present invention relates to memory devices and more particularly to non-volatile memory internal data move operations.

BACKGROUND

Error detection and correction (ECC) engines are well known to those skilled in the art. An ECC engine is a device which performs a process of detecting for error and correcting errors to ensure the accuracy and integrity of data during a data transmission. Different ECC engines are based on Hamming Codes, Reed-Solomon Codes or other techniques to correct for data errors.

In memory systems a memory controller typically writes data and ECC data to a memory device. The ECC data is used by the controller during a read operation to identify and correct errors that may have occurred since the data was written to the memory.

Memory devices can be categorized in two broad areas as volatile and non-volative. Volatile memory devices require power to maintain data, while non-volative memories are capable of maintaining data in the absence of a power supply.

DESCRIPTION

In the following detailed description of the invention, reference is made to the accompanying drawings which form a part hereof, and in which is shown, by way of illustration, different embodiments in which the invention may be practiced. These embodiments are described in sufficient detail to enable those skilled in the art to practice the invention. Other embodiments may be utilized and structural, logical, and electrical changes may be made without departing from the scope of the present invention.

The following detailed description is, therefore, not to be taken in a limiting sense, and the scope of the present invention is defined only by the appended claims, along with the full scope of equivalents to which such claims are entitled.

Embodiments of the present invention can include a semiconductor memory device having an array of memory cells. The memory cells are non-volatile, and can be charge trapping cells such as floating gate transistors or NROM cells, phase-change memory cells such as chalcogenide cells, programmable conductor random access memory (PCRAM), latching cells such as SRAM, or magnetic random access memories (MRAM's). In addition, the memory cells can store one or more bits per cell.

Figure 1:
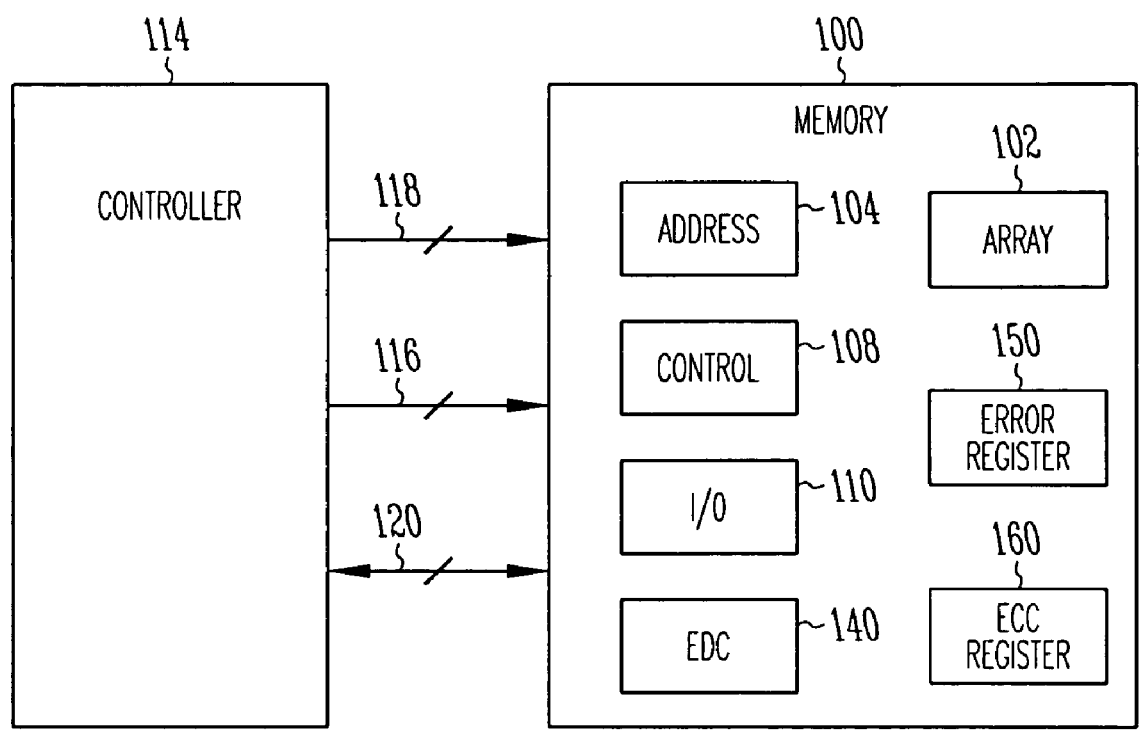
FIG. 1 is a block diagram of a memory system according to an embodiment of the invention.

FIG. 1 is a simplified block diagram of an integrated circuit dynamic memory device 100 in accordance with an embodiment of the invention. The memory device 100 includes an array of non-volatile memory cells 102, an address circuitry 104, and Input Output (I/O) circuitry 110. In one embodiment the memory array is a NAND Flash memory array. In another embodiment, the memory array is a NOR Flash memory array.

A control circuit 108 is provided to manage memory operations, such as read, write and erase operations. As explained below, one memory operation performed by the memory control circuitry includes an internal data move operation.

The memory device 100 can be coupled to a controller 114 for accessing the memory array 102. The memory device 100 receives control signals across control lines 116 from the controller 114 to control access to the memory array 102. Access to the memory array 102 is directed to one or more target memory cells in response to address signals received across address lines 118. Once accessed in response to the control signals and the address signals, data is written to or read from the memory cells across data, DQ, lines 120.

It will be appreciated by those skilled in the art that additional circuitry and control signals can be provided, and that the memory device of FIG. 1 has been simplified to help focus on the invention. It will be understood that the above description of a memory device is intended to provide a general understanding of the memory and is not a complete description of all the elements and features of a typical memory device.

The non-volatile memory also includes an error detecting code (EDC) circuit 140. As described below, the EDC in one embodiment uses parity bits to detect errors, and in another embodiment uses ECC data provided by the controller 114.

Non-volatile memory devices, such as FLASH memories, often perform an internal data move operation. This operation is performed as part of "house keeping." That is, data stored in a first memory array location is moved to a second memory array location so that memory operations, such as memory cell erasing, can be performed on the first location.

In prior art memory devices, the data is not read by the controller during the move operation. As such, the ECC circuitry of the controller is not employed during the move to determine if an error exists in the memory data.

In one embodiment, the EDC circuit 140 of the non-volatile memory device 100 uses a parity technique for identifying single bit errors. As such, when data is written to the memory array parity is also stored in the memory. The parity data can be internally generated and stored for later use. The parity data can be stored in the array or in an overhead location. For example, in one embodiment a 512 bit array sector has 16 bits of overhead reserved for the parity data. The parity data can be restricted from external access.

During an internal data move the parity bit is used to detect single bit errors. The memory controller 114 can check the status of an error register 150 to determine if an error was detected while executing the internal move. If an error is detected, the controller can read the data from the memory into a buffer of the controller, perform an ECC operation to correct the error, and write the corrected data back into the memory. The error register can be one or multiple bits long. That is, a simple status flag can be used in one embodiment to indicate that an error was detected.

In another embodiment, the memory device 100 includes an ECC register 160 for storing ECC information provided by the controller. The register can store an indication of the ECC scheme employed by the controller, for example Hamming, BCH or Reed-Solomon coded. In addition to the type of ECC used by the controller, register 160 can store an address, or offset, of the location of the ECC data bytes associated with array data. ECC techniques are well know in the art and are not listed or described in detail herein. It will be understood that embodiments of the present invention can be implemented without limitation to a specific ECC code(s).

The EDC circuit 140 detects errors during internal data move operations using the ECC register 160 information.

That is, the EDC uses the identified ECC code and ECC data to detect errors. The memory controller 114 can check the status of an error register 150 to determine if an error was detected while executing the internal move. The error register can be one or multiple bits long. That is, a simple status flag can be used in one embodiment to indicate that an error was detected.

If an error is detected, the controller can read the data from the memory into a buffer of the controller, perform an ECC operation to correct the error, and write the corrected data back into the memory. To reduce the time needed by the controller to correct the error, the error register, in one embodiment, contains multi-bit repair solution data. As such, the controller only needs to execute the repair solution prior to re-writing the data to the memory.

It will be appreciated that there are a wide variety of ECC schemes available for use by the controller. Implementing each of these schemes on the memory device would be cost prohibitive. As such, the memory device may be limited to implementing an EDC technique based on one, or a select few, ECC scheme(s).

Figure 2:
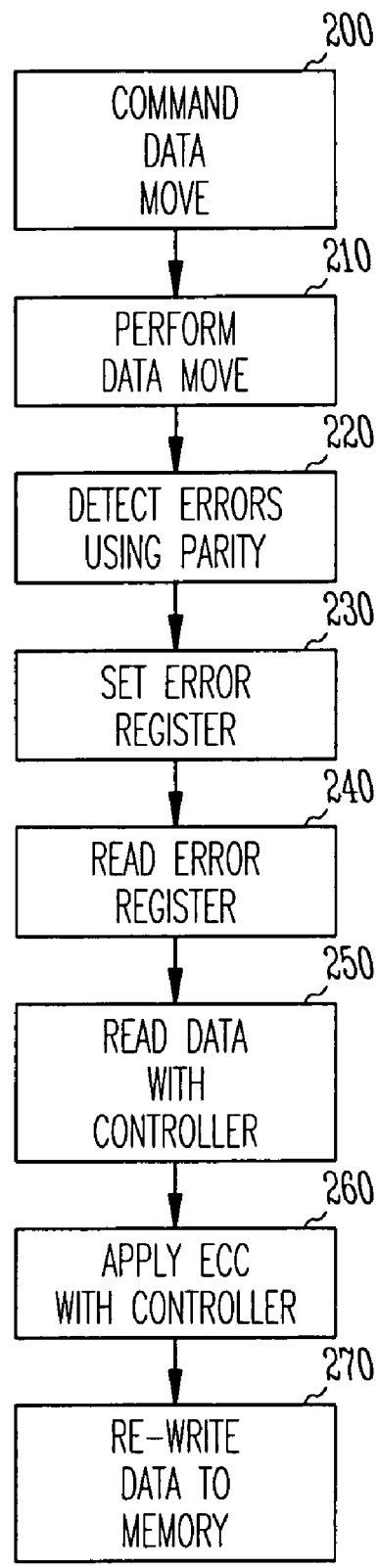
FIG. 2 is a flow chart illustrating embodiments of the present invention.

FIG. 2 is a flow chart illustrating embodiments of the present invention. The memory controller instructs the non-volatile memory to perform an internal data move operation 200. The memory moves data from a first location to a second location within the memory array 210. An error detection operation is performed 220 using parity data stored in the memory. In response to the error detection operation, an error register is set 230 accordingly. Upon completion of the data move, the controller reads the error register 240 to determine if an error was detected. If an error was detected, the controller reads the moved data 250, applies an ECC operation 260 and re-writes the corrected data to the memory 270.

Figure 3:
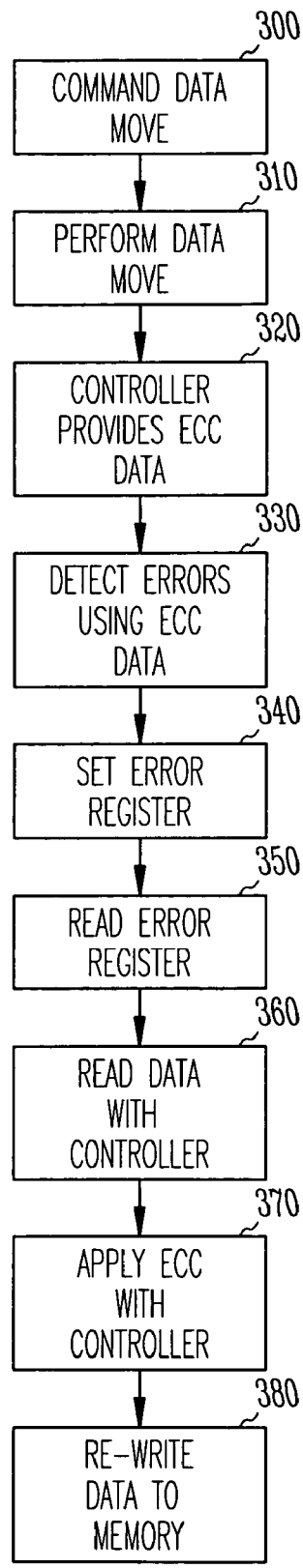
FIG. 3 is a flow chart illustrating additional embodiments of the present invention.

FIG. 3 is a flow chart illustrating additional embodiments of the present invention. The memory controller instructs the non-volatile memory to perform an internal data move operation 300. The memory moves data from a first location to a second location within the memory array 310. The controller provides an indication of the ECC technique implemented by the controller and a location identifier of the ECC data corresponding to the moved data 320. An error detection operation is performed 330 using the ECC data stored in the memory. In response to the error detection operation, an error register is set 340 indicating an error status, and optionally a repair solution for the moved data. Upon completion of the data move, the controller reads the error register 350 to determine if an error was detected, and the repair solution. If an error was detected, the controller reads the moved data 360, applies the repair solution 370 and re-writes the corrected data to the memory 380.

Embodiments of the present invention allow internal data move operations in a non-volatile memory while identifying data errors. The error detection can be implemented by using parity data or ECC data stored in the memory. Results of the error detection can be accessed by a memory controller for data repair operations by the controller.

The invention claimed is:

1. A non-volatile memory device comprising:
    an array of memory cells;
    control circuitry to perform an internal data move operation wherein memory data is moved from a first array location to a second array location;
    an error detection circuit to detect the presence of at least a one bit error in the memory data;
    an error register programmable to indicate an error state of the error detection circuit; and
    an error correction code (ECC) register to store ECC data, wherein the ECC data includes an indication of an ECC scheme used by an external memory controller.

2. The non-volatile memory device of claim 1 wherein the array of memory cells comprises floating gate transistor memory cells.

3. The non-volatile memory device of claim 1, wherein the ECC data comprises an indication of a location of ECC data bits corresponding to the memory data.

4. The non-volatile memory device of claim 1 wherein the error detection circuit detects at least a one bit error in the memory data using parity data stored in the memory.

5. The non-volatile memory device of claim 4 wherein the parity data was internally generated by the memory.

6. A non-volatile memory device comprising:
    an array of memory cells;
    control circuitry to perform an internal data move operation wherein memory data is moved from a first array location to a second array location;
    an error detection circuit to detect a presence of at least a one bit error in the memory data, wherein the error detection circuit comprises a parity check circuit;
    an error register programmable to indicate an error state of the error detection circuit and
    an error correction code (ECC) register to store ECC data, wherein the ECC data includes an indication of an ECC scheme used by an external memory controller, 7. The non-volatile memory device of claim 6 wherein the control circuitry is configured to store parity data in the memory device associated with the memory data.

8. The non-volatile memory device of claim 7 wherein the parity data is stored in the array of memory cells.

9. A non-volatile memory device comprising:
    an array of memory cells;
    control circuitry to perform an internal data move operation wherein memory data is moved from a first array location to a second array location;
    an error detection circuit to detect a presence of at least a one bit error in the memory data;
    an error correction code (ECC) register to store ECC data comprising an indication of an ECC scheme used by an external memory controller, and an indication of a location of ECC data bits corresponding to the memory data, wherein the error detection circuit implements the ECC data to detect the presence of an error in the memory data; and
    an error register programmable to indicate an error state of the error detection circuit.

10. The non-volatile memory device of claim 9 wherein the error register is readable by the external memory controller.

11. A system comprising:
    a memory controller;
    a memory coupled to communicate with the memory controller, wherein the memory comprises,
        control circuitry to perform an internal data move operation wherein memory data is moved from a first memory array location to a second memory array location in response to the memory controller,
        an error detection circuit to detect the presence of at least a one bit error in the memory data, and
        an error register programmable to indicate an error state of the error detection circuit, wherein the error register can be read by the memory controller; and
    wherein the memory further comprises an error correction code (ECC) register to store ECC data indicating an ECC scheme implemented by the memory controller, and the error detection circuit implements the ECC data to detect the presence of an error in the memory data.

12. The system of claim 11 wherein the error detection circuit detects at least a one bit error in the memory data using parity data stored in the memory.

13. The system of claim 11, wherein the ECC data further comprises an indication of a location of ECC data bits corresponding to the memory data.

14. A system comprising:
a memory controller; and
a memory coupled to communicate with the memory controller, wherein the memory comprises,
an array of memory cells,
control circuitry to perform an internal data move operation wherein memory data is moved from a first array location to a second array location,
an error detection circuit to detect a presence of at least a one bit error in the memory data, wherein the error detection circuit comprises a parity check circuit, and
an error register programmable to indicate an error state of the error detection circuit, wherein the error correction register stores ECC data indicating an ECC scheme implemented by the memory controller, and the error detection circuit implements the ECC data to detect the presence of an error in the memory data.

15. A system comprising:
a memory controller; and
a memory coupled to communicate with the memory controller, wherein the memory comprises,
an array of memory cells,
control circuitry to perform an internal data move operation wherein memory data is moved from a first array location to a second array location,
an error detection circuit to detect a presence of at least a one bit error in the memory data,
an error correction code (ECC) register to store ECC data comprising an indication of an ECC scheme used by an external memory controller, and an indication of a location of ECC data bits corresponding to the memory data, wherein the error detection circuit implements the ECC data to detect the presence of an error in the memory data; and
an error register programmable to indicate an error state of the error detection circuit.

16. A method comprising:
performing an internal data move operation in a memory device, wherein the data move operation comprises moving data from a first storage location to a second storage location;
evaluating the data to determine if an error is present in the data using an error detection circuit of the memory device;
programming a readable register to indicate an error status based upon the evaluation; and
programming an ECC register located in the memory to indicate an ECC scheme implemented by an external memory controller.

17. The method of claim 16 wherein evaluating the data comprises performing a parity check operation on the data using at least one parity check bit stored in the memory device.

18. The method of claim 16 wherein evaluating the data comprises performing an error detection operation using error correction code (ECC) data stored in the memory device.

19. The method of claim 18 further comprises storing the ECC data in the memory using the external memory controller.

20. A method of operating a non-volatile memory comprising:
writing data to a first storage location;
performing a parity check of the data and storing at least one parity bit in the memory;
performing an internal data move operation in a memory device, wherein the data move operation comprises moving the data from the first storage location to a second storage location;
evaluating the data to determine if an error is present in the data using an error detection circuit of the memory device, wherein the error detection circuit uses the at least one parity bit;
programming a readable register to indicate an error status based upon the evaluation; and
programming an ECC register located in the memory to indicate an ECC scheme implemented by an external memory controller.

21. A method of operating a non-volatile memory comprising:
writing data to a first storage location of the memory;
writing error correction code (ECC) data in the memory corresponding to the data;
performing an internal data move operation in a memory device, wherein the data move operation comprises moving the data from the first storage location to a second storage location;
evaluating the data to determine if an error is present in the data using an error detection circuit of the memory device, wherein the error detection circuit uses the ECC data;
programming a readable register to indicate an error status based upon the evaluation; and
programming an ECC register located in the memory to indicate an ECC scheme implemented by an external memory controller.

22. The method of claim 21 wherein the ECC data is provided by an external memory controller.

23. The method of claim 21 wherein programming the readable register further comprises storing data indicating a repair solution for detected errors.

24. A method of operating a memory system comprising:
performing an error correction code (ECC) operation on data using a memory controller;
writing the data to a first storage location of a memory;
storing ECC data, corresponding to the data, in the memory;
in response to the memory controller, performing an internal data move operation in a memory device, wherein the data move operation comprises moving the data from the first storage location to a second storage location;
while performing the internal data move operation, determining if an error is present in the data using an error detection circuit of the memory device, wherein the error detection circuit uses the ECC data stored in the memory;
programming a register located in the memory to indicate an error status based upon the determination;
programming an ECC register located in the memory to indicate an ECC scheme implemented by an external memory controller; and
reading the register with the memory controller following the internal data move operation.

25. The method of claim 24 further comprising:
reading the data from the second location with the memory controller;
correcting at least one error in the data; and
writing the corrected data to the memory device.

* * * * *

UNITED STATES PATENT AND TRADEMARK OFFICE
CERTIFICATE OF CORRECTION

| | | |
|---|---|---|
| PATENT NO. | : 7,523,381 B2 | Page 1 of 1 |
| APPLICATION NO. | : 11/219535 | |
| DATED | : April 21, 2009 | |
| INVENTOR(S) | : Eggleston et al. | |

It is certified that error appears in the above-identified patent and that said Letters Patent is hereby corrected as shown below:

In column 4, line 23, in Claim 6, delete "controller," and insert -- controller. --, therefor.

In column 6, line 58, in Claim 24, delete "controller;" and insert -- controller; --, therefor.

Signed and Sealed this

Eighteenth Day of August, 2009

David J. Kappos
*Director of the United States Patent and Trademark Office*